US006332972B1

United States Patent
Orolin et al.

(12) United States Patent
(10) Patent No.: US 6,332,972 B1
(45) Date of Patent: Dec. 25, 2001

(54) DECONTAMINATION METHOD AND SYSTEM, SUCH AS AN IN-SITU GROUNDWATER DECONTAMINATION SYSTEM, PRODUCING DISSOLVED OXYGEN AND REACTIVE INITIATORS

(75) Inventors: John J. Orolin; Vaughn A. Sucevich, Sr., both of West Linn, OR (US); Troy T. Johnson, Seattle; Scott A. Schorzman, Brier, both of WA (US)

(73) Assignee: H20 Technologies, Ltd., Philadelphia, PA (US)

(*) Notice: Subject to any disclaimer, the term of this patent is extended or adjusted under 35 U.S.C. 154(b) by 0 days.

(21) Appl. No.: 09/466,105

(22) Filed: Dec. 17, 1999

(51) Int. Cl.[7] .................................................... C02F 1/461
(52) U.S. Cl. .......................... 205/742; 205/751; 205/752; 205/755; 205/756; 205/761; 204/275.1; 204/278; 204/278.5
(58) Field of Search ..................................... 205/742, 751, 205/752, 755, 756, 761; 204/275.1, 278, 278.5

(56) References Cited

U.S. PATENT DOCUMENTS

| 5,324,398 | 6/1994 | Erickson et al. ...................... 204/149 |
| 5,326,439 | * 7/1994 | Brewster ................................ 205/761 |
| 5,328,584 | 7/1994 | Erickson et al. ...................... 204/229 |
| 5,728,287 | 3/1998 | Hough et al. .......................... 205/743 |
| 5,874,001 | 2/1999 | Carter .................................... 210/610 |
| 5,911,870 | 6/1999 | Hough .................................... 205/701 |
| 5,957,196 | 9/1999 | Gibson et al. ........................ 166/163 |

FOREIGN PATENT DOCUMENTS

| 0 901 844 A2 | 3/1999 | (EP). |
| WO 95/21795 | 8/1995 | (WO). |

* cited by examiner

Primary Examiner—Arun S. Phasge

(57) ABSTRACT

An apparatus for decontamination contaminated groundwater in-situ by increasing the quantity of dissolved oxygen in the contaminated groundwater and generating reactive initiators to remediate the contaminated groundwater. The apparatus includes a submersible pump, an electrolytic cell, and a distribution chamber attached to an outlet of the cell. The distribution chamber is vertically oriented and longitudinally-extending from the outlet of the cell. As the groundwater flows across charging plates of the cell, some of the molecules break into their component parts of hydrogen gas and oxygen gas. A selected vertical length of the chamber provides a resident time for the fluid allowing a majority of the gaseous oxygen to transition to dissolved oxygen.

10 Claims, 10 Drawing Sheets

US 6,332,972 B1

DECONTAMINATION METHOD AND SYSTEM, SUCH AS AN IN-SITU GROUNDWATER DECONTAMINATION SYSTEM, PRODUCING DISSOLVED OXYGEN AND REACTIVE INITIATORS

TECHNICAL FIELD

This invention relates generally to decontamination systems, and more particularly, to apparatuses and methods for decontaminating in-situ groundwater by producing high amounts of dissolved oxygen and reactive initiators such as hydroxyl radicals.

BACKGROUND OF THE INVENTION

Much attention has been given to the preservation of our water supplies and resources, particularly since the mid 1960's. Agencies have become aware of the health effects of toxic pollutants on humans and the increased demands for potable water in this country and the world. Government agencies, for example, the Environmental Protection Agency (EPA), have responded by establishing maximum contaminant levels for many toxic chemical compounds. Today, once a chemical regulated under government law is identified in soil or water above the maximum contaminant level, facility operators or property owners are required to initiate assessment and remediation of the contamination. In some cases, the cost of cleaning up discharges of certain chemicals can greatly exceed the value of the contaminated property. In the past, the remediation of contaminated soil involved excavation and disposal of the impacted media. However, if the contaminant had reached the groundwater, the risk to the public welfare, remedial cost, and amount of time required to remove the contaminants increased substantially.

Biological treatment of water contaminants or organic chemicals with total petroleum hydrocarbons (TPH) and other contaminants has become an important process in controlling the pollution of the aquatic environment from industrial sources. The mineralization of organic chemicals depends on the nature of the chemical compounds involved. Some chemicals that find their way into the aquifer from industrial processes or natural processes resist degradation and are recalcitrant in nature; thereby accumulating in the environment.

It is well known that natural remediation occurs when facilitated by aerobic compounds in the soil. The injection of an oxygen release compound into the soil has been previously performed with a target of reducing the contaminants at a site. Some of these results are described in *The ORC Oracle Newsletter* 3:1, published by Regenesis.

This prior art method was a passive anaerobic biodegradation and was slow, incomplete and limited in its scope of impact. Since the system was passive, it was reliant on groundwater flow to distribute dissolved oxygen. Therefore, only groundwater downstream of the well was within the impacted area. Further, when the flow of groundwater was slow, the attenuation rate of the leached dissolved oxygen was correspondingly slow.

SUMMARY OF THE INVENTION

According to principles of the present invention, an apparatus is provided for increasing the quantity of dissolved oxygen in contaminated fluid. The apparatus includes a submersible pump for drawing the contaminated fluid across an electrolytic cell. The electrolytic cell includes a distribution chamber attached to an outlet of the cell. When the apparatus is immersed in the contaminated fluid and power is supplied to the pump and the cell, contaminated fluid enters through a pump intake, is pumped into a cell housing across the cell and exits out perforations in the distribution tube. Electricity flows through the fluid across charging plates of the cell, breaking some of the water molecules into their component parts of hydrogen gas and oxygen gas. At the outlet of the cell, both hydrogen gas and oxygen gas are present in the fluid. The distribution chamber is vertically oriented and longitudinally-extending from the outlet of the cell. The vertical length of the chamber is selected to provide a resident time for the fluid allowing a majority of the gaseous oxygen to transition to dissolved oxygen.

The apparatus can be used in-situ by placing the decontamination apparatus in a well below an elevation for the contaminated groundwater. When power is supplied to the system, the pump draws groundwater into the cell housing across the cell, while electricity flowing through the cell breaks some of the molecules into their component parts of hydrogen gas and oxygen gas. In some embodiments, it also generates reactive initiators to further remediate the contaminated groundwater.

DETAILED DESCRIPTION OF THE INVENTION

A decontamination system, and in particular, an apparatus and a method for decontaminating in-situ groundwater by producing high amounts of dissolved oxygen and reactive initiators, such as hydroxyl radicals, is described in detail below. In the following description, numerous specific details are set forth, such as example environments, contaminants, configurations and material selection, etc., to provide an understanding of the invention. One skilled in the relevant art will readily recognize that the invention can be practiced without one or more of the specific details, or may be practiced to decontaminate other contaminants, materials, etc. Well-known structures or operations are not shown or described in detail to avoid obscuring aspects of the invention.

Figure 1:
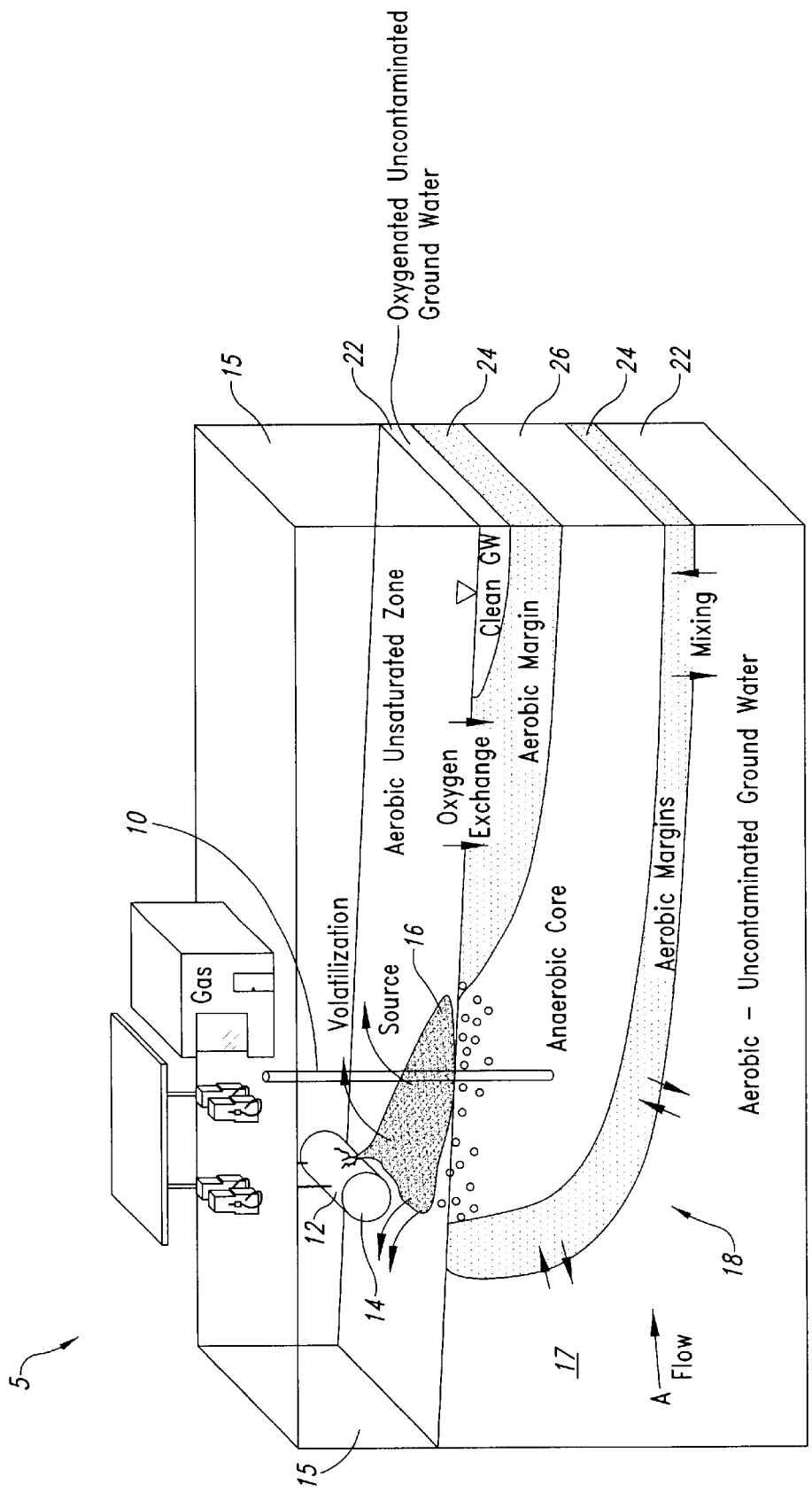
FIG. 1 is an isometric view of a contaminated groundwater site.
Figure 2:
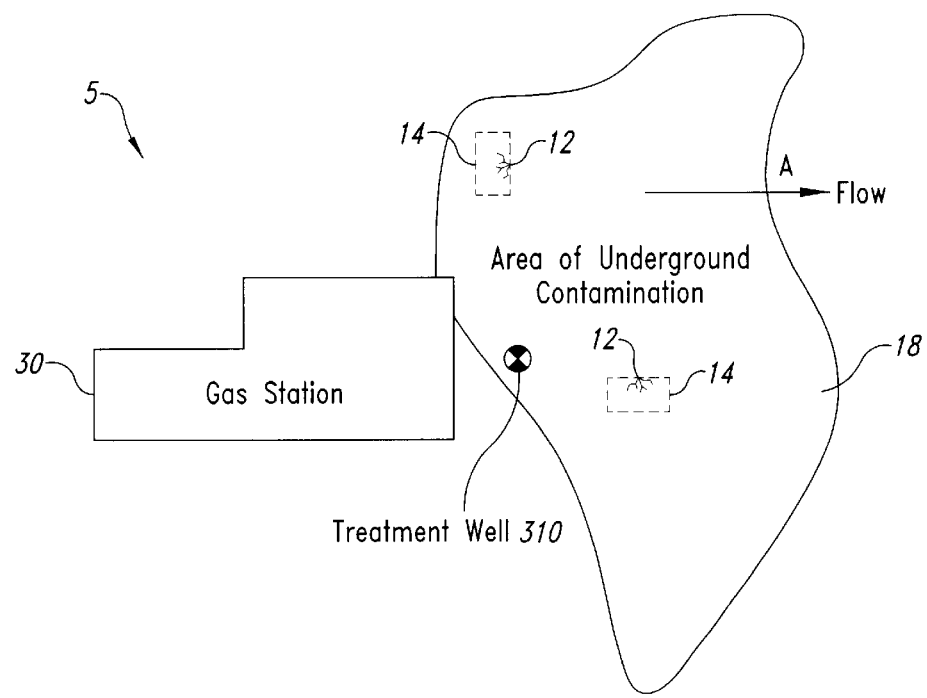
FIG. 2 is a plan view of a site, including a well with a decontamination apparatus therein according to the present invention.

FIGS. 1 and 2 illustrate a decontamination apparatus 10 placed in a contaminated environment 5. In this exemplary illustration, soil 15 and groundwater 17 may become contaminated when a holding tank 14 springs a leak 12, creating a contamination source 16. Alternatively, a surface spill may be the source 16 of the contamination 16 into the surrounding soil and groundwater. A natural flow of the groundwater is indicated in FIG. 1 by arrow A. The source 16 contaminates the groundwater 17 in a plume 18 of contaminant carried downstream. Uncontaminated groundwater 22 can exist at a point outside the impact area of the plume 18, creating an aerobic margin 24 along a perimeter of the plume 18. Mixing and natural bioremediation occurs in this aerobic margin 24 through an oxygen exchange with the uncontaminated groundwater 22. A center section of the plume 18 consists of an anaerobic contaminated core 26 of groundwater. In one embodiment of the present invention, the decontamination apparatus 10 is positioned within the anaerobic core 26 to facilitate bioremediation of the contaminated groundwater by increasing the quantity of dissolved oxygen and generating reactive initiators. In some sites, there may not be an identified anaerobic core and the decontamination apparatus is placed at a suitable location adjacent to or within the source 16 where it has affected the groundwater.

FIG. 2 illustrates a plan view of the exemplary contaminated environment 5 with a well having the decontamination apparatus 10 therein, located in an upstream location relative to the flow (indicated by arrow A). A gas station 30 may have more than one tank 14, each of which may have a leak 12 creating a plume 18 of contamination in the groundwater. The flow of groundwater may change the scope of the plume 18 and thus the location of one or more decontamination apparatuses 10 should be selected to take this into account.

Figure 3:
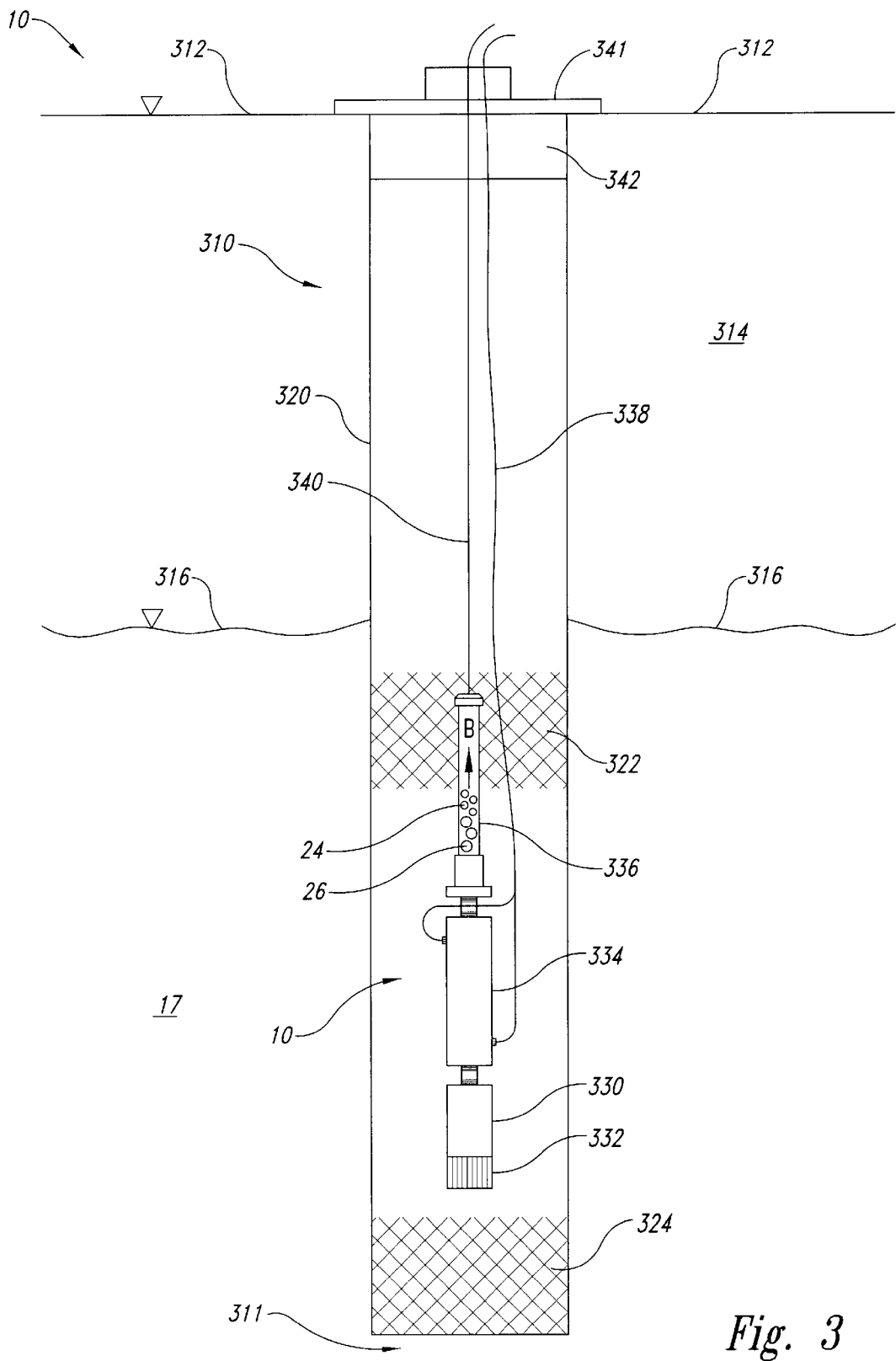
FIG. 3 is a cross section of the well of FIG. 2, with one embodiment of the decontamination apparatus therein, according to the principles of the present invention.

FIG. 3 illustrates one embodiment of the system in operation. In this embodiment, the decontamination apparatus 10 is lowered into the well 310 and submerged below an elevation of the contaminated groundwater. Solids are allowed to settle out under the decontamination apparatus 10, and therefore it is desirable that the decontamination apparatus 10 is suspended above a bottom elevation 311 of the well 310. Alternatively, the decontamination apparatus 10 can be placed in a lake, pond, tank or conduit containing contaminated fluid to be treated.

The well 310 extends from a ground level 312 of a soil 314 to below a water table elevation 316. Depending on the in-situ soil conditions, the well 310 can include a casing 320 to prevent the soil 314 from caving in. The casing 320 can include a well screen 322 at a lower elevation of the well 310 that allows groundwater to easily flow into and out of the casing 320 without undue clogging. An intake screen 324 may also be included at a bottom elevation of the casing 320 to further facilitate groundwater flow.

The decontamination apparatus 10 shown in FIG. 3 includes a submersible pump 330 with a pump intake 332, an electrolytic cell 334, a gas distribution chamber 336, power cords 338, support cable 340, and an apparatus support housing 341 including a gas absorption device 342. The pump 330 is positioned beneath and coupled to the electrolytic cell 334. The electrolytic cell is positioned beneath and coupled to the distribution chamber 336. The chamber 336 may be a tube having the same, or in some instances a larger or smaller diameter than the cell housing. The length of the chamber 336 may also be varied. In other embodiments, the distribution chamber may be other shapes, besides a tube. If a casing 320 is used, the gas distribution chamber 336 can be positioned adjacent to the well screen 322. The gas absorption device 342 is positioned at the top of the well 310 and is included within a support housing 341 that is capable of supporting the weight of the decontamination apparatus 10 within the well 310.

The pump 330 serves to draw fluid in through the pump intake 332 and through the electrolytic cell 334. One example of an acceptable submersible pump is a pump with a 3 gallon per minute (gpm) recirculation rate, 12VDC input, 5 amp continuous current draw, 10 amp internal fuse, stainless steel impeller, rugged ABS outer housing and nitrile seals. It may be 6 inches in length and have an output coupling of a ½-inch hose connection for connecting the pump 330 to the electrolytic cell 334.

The pump 330 circulates the water 17 for decontamination treatment and cell cleaning. The pump 330 normally runs longer than the cell 334 during a treatment cycle, which allows fluid to travel across plates of the cell 334 without power applied to the cell plates. This helps to clean the cell plate of any deposits of calcium carbonate or magnesium carbonate that may have accumulated on the cell plates during treatment.

Figure 4:
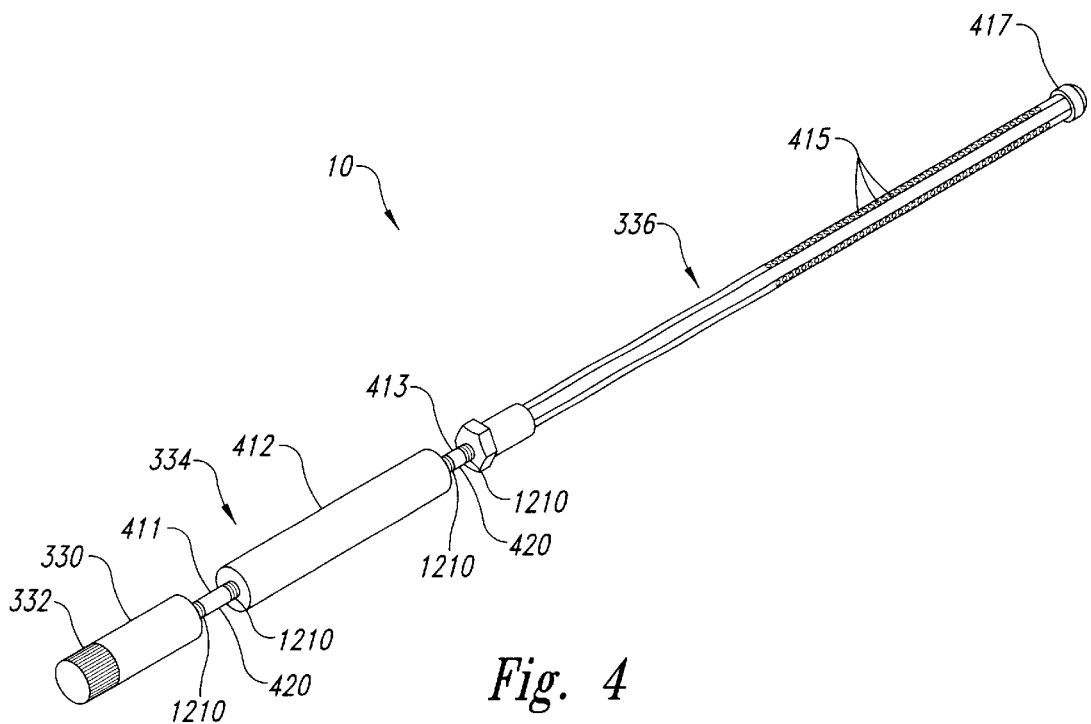
FIG. 4 is an isometric view of one embodiment of the decontamination apparatus according to the principles of the present invention.

FIG. 4 is one embodiment of the decontamination apparatus 10. It includes a pump 330, an electrolytic cell 334 in a housing 412 and a distribution chamber 336. A first coupling 411 connects the pump 330 to the cell 334 and a second coupling 413 connects the cell 334 to the distribution chamber 336. Each of the first and second couplings 411, 413 comprise a pair of barbed fittings 1210, each barbed fitting extending into an open end of a length of flexible tubing 420 that extends between the pair of barbed fittings. An interference fit is created between the barbed fittings and the flexible tubing. As a result, the decontamination apparatus 10 is flexible, allowing it to freely move through the contours of a well. The distribution chamber 336 is shown as a gas distribution tube in this embodiment although a variety of alternative shapes are acceptable. The chamber 336 may be a tube having the same, or in some instances a larger or smaller diameter than the cell housing. The length of the chamber 336 may also be varied. In other embodiments, the distribution chamber may be other shapes, besides a tube.

The distribution chamber or gas distribution tube 336 has a solid portion 410 and a plurality of perforations or small holes 415. The holes are of a size that permits the free flow of water into and out of the tube 336 while still providing a guideway for oxygen or hydrogen that may remain in the gas phase. The holes 415 may be in the range of ⅛ to ½-inch in diameter and in a preferred embodiment, are ¼inch in diameter. A cap 417 on the tube 336 ensures that all treated water is forced out of the tube 336 through holes 415. Usually, the solid portion 410 will be about half the length of the tube 336 and the perforation 415 extends for about the other half.

Figure 5:
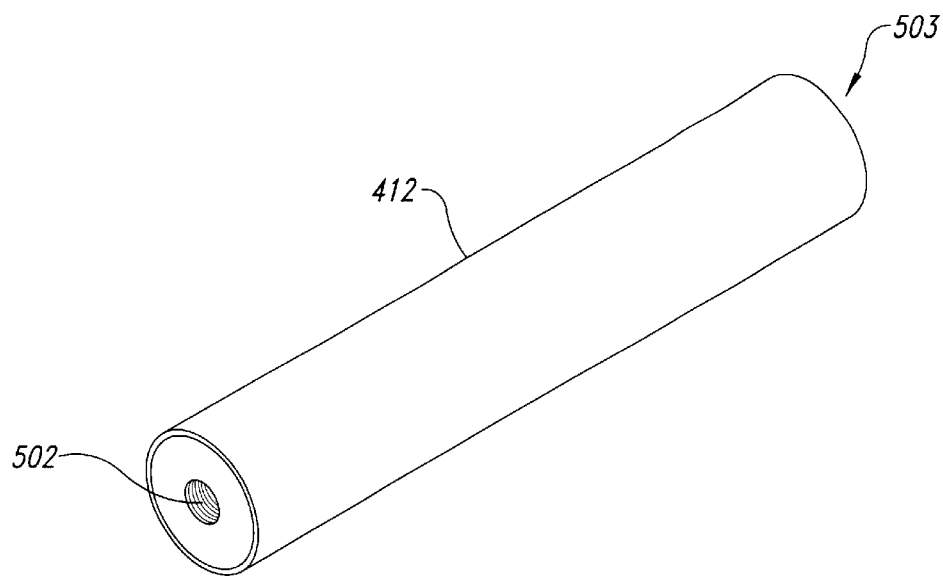
FIG. 5 is an enlarged view of the electrolytic cell plate assembly housing shown in FIG. 4 according to the principles of the present invention.
Figure 6:
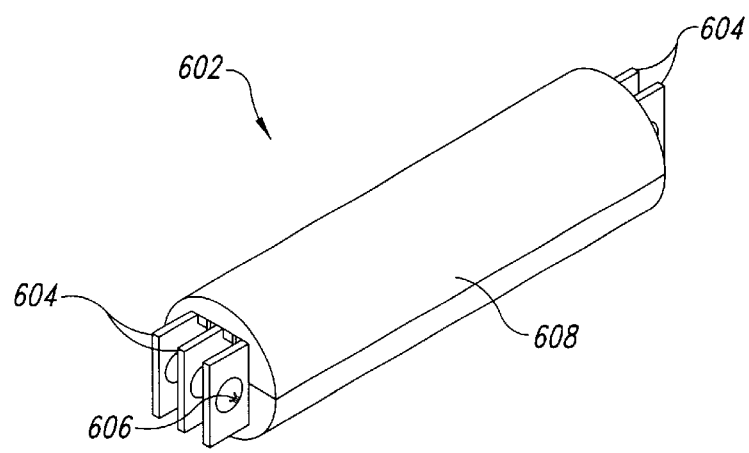
FIG. 6 is an isometric view of the electrolytic plate assembly of the embodiment shown in FIG. 4 according to the principles of the present invention.

FIG. 5 is an enlarged view of the housing 412 in which the electrolytic cell 334 of FIG. 2 is positioned. A threaded inlet 502 is provided at one end for permitting easy attachment of coupling 411 for the liquid to freely enter. An outlet 503 provided at the other end of the housing is also threaded on its internal surface for connection to coupling 413. FIG. 6 illustrates the electrolytic cell plate assembly 602 housed within the housing of FIG. 5. In the exemplary embodiment, the housing 412 of the electrolytic cell 334 and tube 336 are constructed from an appropriate plastic selected for a particular application. A diameter of ½" can be sufficient, but for certain applications, the diameter may be 1", 2", 3" or larger.

As shown in FIG. 6, electrolytic cell plate electrodes 604 are contained within a cell plate housing 608. The cell plate housing 608 may be constructed of the same material as the cell housing 412. The electrodes 604 of the electrolytic cell are appropriately connected to the positive and negative power supplies, as is known in the art. The length and the number of the electrodes 604 is selected so as to provide the desired amount of oxygen generation, again according to known principles.

Figure 7:
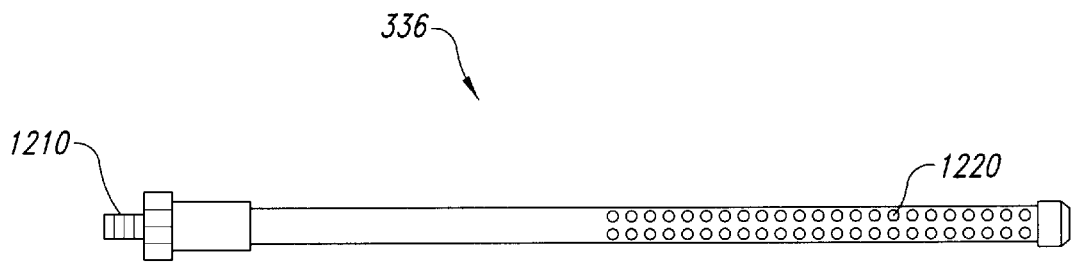
FIG. 7 is a side view of the gas distribution tube of the embodiment of FIG. 4.

According to one embodiment of the present invention, and as shown in FIG. 7, the gas distribution tube 336 is a straight, longitudinally-extending tube with an unrestricted cross-sectional area. One end of the gas distribution tube 336 includes a coupling 413 having barbs 1210 for connecting to a barbed fitting on the electrolytic cell housing 412 via a length of flexible tubing as described above. At an opposite end of the gas distribution tube 336, perforations 1220 allow the treated water to exit. The unrestricted cross-sectional area permits water to pass therethrough in laminar flow without encountering obstructions. This provides a quiet zone, which permits the oxygen molecules to more easily be dissolved into the water. If the gas distribution tube 336 is made too short, the housing will terminate before a majority of the oxygen has dissolved into the water and will thus be exposed to surface air and exit in the gaseous form, rather than becoming dissolved in the water. Further, if turbulence is induced in the water, such as by having a sharp turn, a 90° elbow, or other obstructions immediately after the cell before sufficient quiet time has been permitted, then the oxygen and hydrogen will be inclined to remain in the gaseous state and not transition to dissolved oxygen.

As shown in FIG. 3, the gas distribution chamber is designed to deliver the gaseous mixture directly into the well screen, enhancing transfer into the aquifer. The gas distribution chamber of the present embodiment is constructed from ½-inch PVC and has a ½-inch PVC barb fitting attached to it. The barbed fitting allows the gas chamber 336 to be attached to a barbed fitting of the cell via flexible tubing, thereby creating a flexible joint. Gas distribution tubes can be in any length with varying perforations to fit the well application best. The standard unit is 3 feet in length with 18 inches of ¼-inch perforations.

Figure 8:
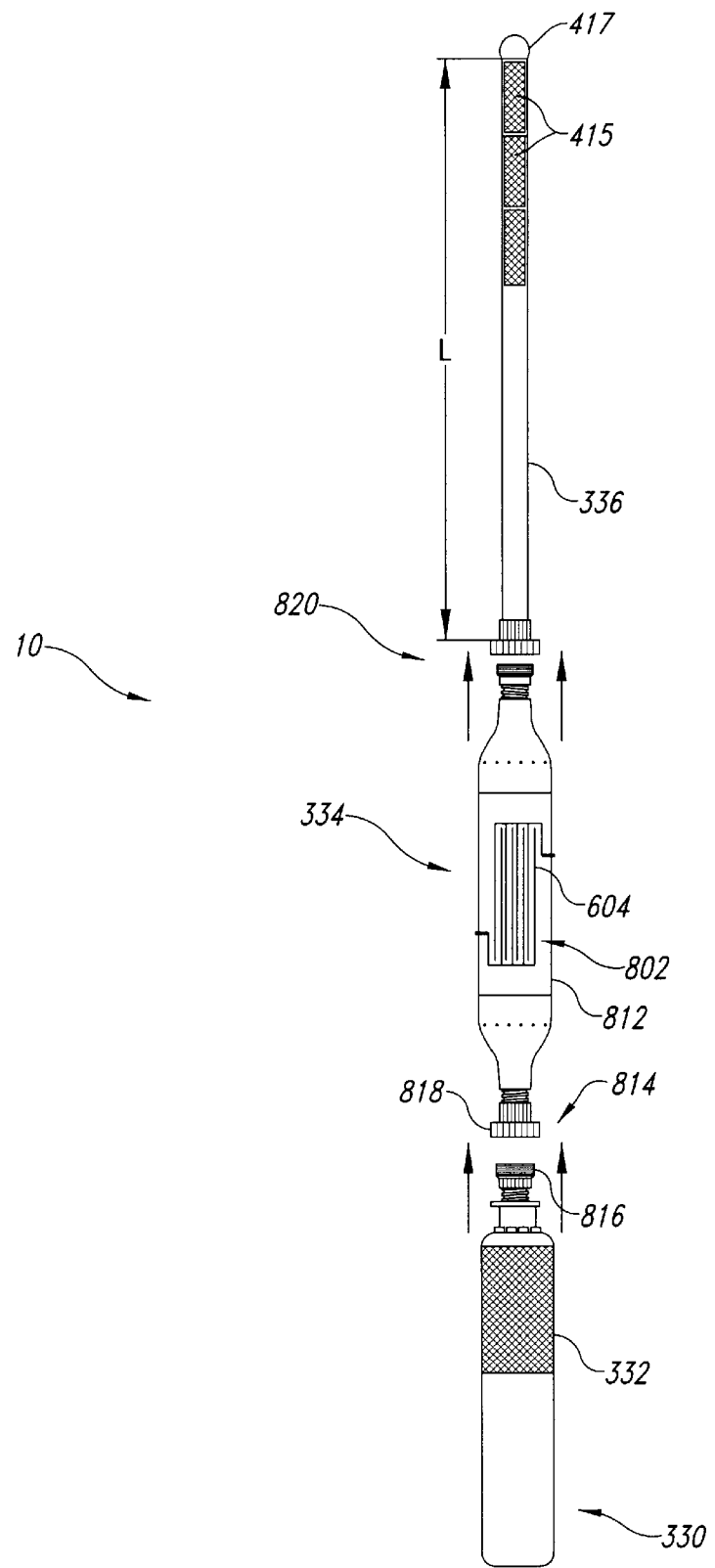
FIG. 8 is an exploded view of another embodiment of the decontamination apparatus according to the principles of the present invention.

As will be appreciated, the optimum length L, as illustrated in FIG. 8, is related to the flow rate desired, as well as the diameter of the tube 336 and other factors. For a very low flow rate, a shorter length L is acceptable because the water will have sufficient resident time such that a majority of the oxygen can transition into dissolved oxygen. On the other hand, for higher flow rates, a longer length L will be desired. Alternatively, the diameter of the tube 336 may be made larger than the diameter of the cell, providing a slower flow rate and longer resident time for the same volume of flow rate.

FIG. 8 shows yet another configuration for the decontamination apparatus 10 with the housing 812 of the cell cut away to reveal the cell assembly 802 configuration within. In one embodiment, the housing 812 has the same cross-sectional diameter as the gas distribution tube 336 so as to provide a generally smooth, laminar transition from the electrolytic cell 334 to the gas distribution chamber 336. Generally, the gas distribution chamber 336 will begin immediately above the electrolytic cell 334 so that the generated oxygen gas can begin to transition into the dissolved state. In an alternative embodiment, the gas distribution chamber 336 has a larger diameter than the cell housing 812 to provide an extended resident time for a given flow rate.

The electrolytic cell 334 in the exemplary embodiment is connected to the pump 330 via a union coupling 814 at one end of the housing of the cell. A male coupling 816 is positioned at a top portion of the pump and a corresponding female coupling 818 is positioned at a bottom portion of the cell is housing. A similar coupling 820 is provided at the top of the cell 334 for connection to the distribution chamber 336. The coupling connection 814 is a significant advantage in providing service and cleaning of the electrolytic cell 334 and the housing 812. When it is desired to service the electrolytic cell 334, such as cleaning the electrodes 604, replacing or servicing any of the components or the like, operation of the system is terminated and the decontamination apparatus is removed from the well. Water is drained from the apparatus. The couplings are then rotated so as to separate the electrolytic cell from the rest of the system. The cell housing is thereafter removed from the system for replacement, servicing or the like if desired. Thereafter, the cell housing, having the new electrolytic cell or the cleaned cell therein is replaced and the couplings are reattached so the system becomes fully operational. The couplings can be any acceptable coupling in the prior art, including rotatable threads, watertight couplings or the like, many such watertight connections being known.

Figure 9:
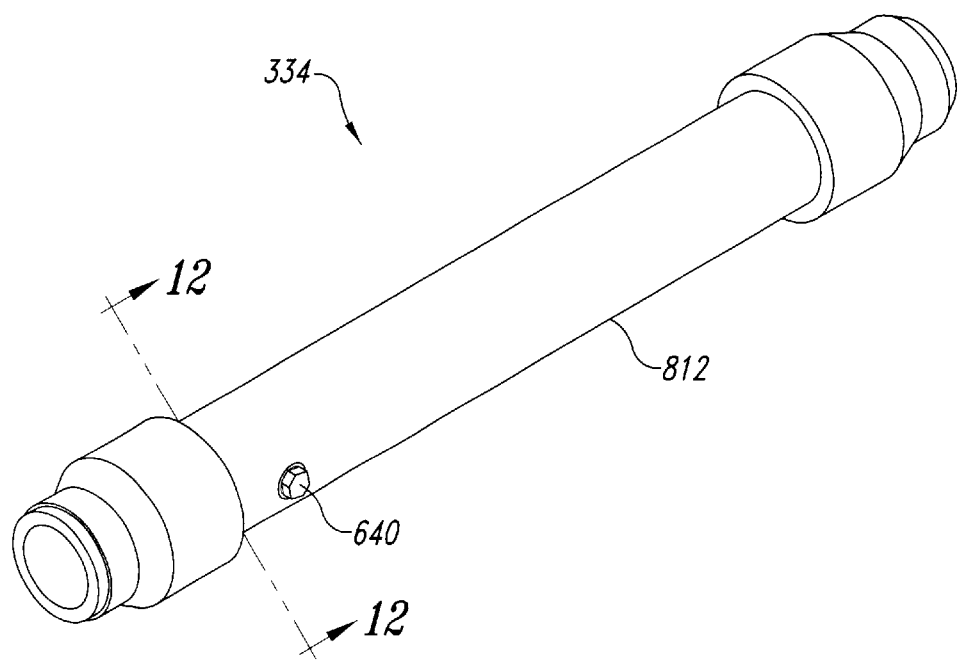
FIG. 9 is an enlarged isometric view of one embodiment of a housing for the cell of FIG. 8 according to the principles of the present invention.
Figure 10:
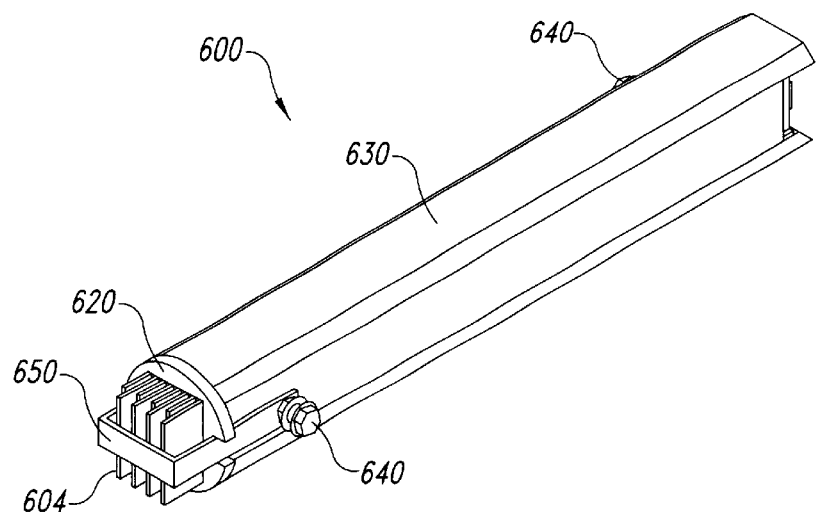
FIG. 10 is an enlarged view of one embodiment of an electrolytic plate assembly for use in the housing shown in FIG. 9 according to the principles of the present invention.
Figure 11:
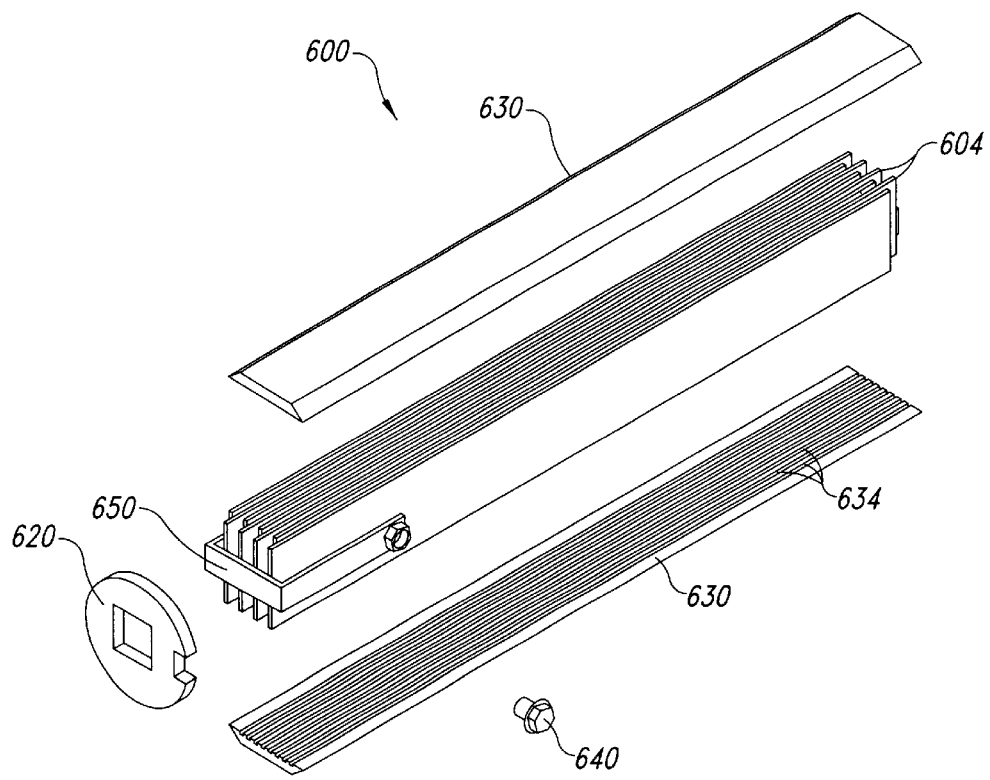
FIG. 11 is an exploded view of one embodiment of the electrolytic plate assembly shown in FIG. 10 according to the principles of the present invention.

In one embodiment of the electrolytic plate assembly 600 shown in FIGS. 9, 10 and 11, electrode plates 604 include anodes and cathodes. The anodes and cathodes can be coated in a double sided material selected from the group comprising noble and transitional metals, for example, EC-400, nickel, platinum, double-sided tin or stainless steel. In one exemplary embodiment, spacing between the charging plates is approximately 0.030–0.250 inch, and more particularly, 0.08 inch. Plate dimensions are 1 inch by 6 inches, although plate size may vary. Plate configuration can be 4 to 12 electrode plates, such as an 8 electrode plate configuration shown in FIG. 10 or a 5 electrode plate configuration shown in FIG. 6. The grooves 634 hold the electrode plates 604 a preset distance apart from each other at all times.

Figure 12:
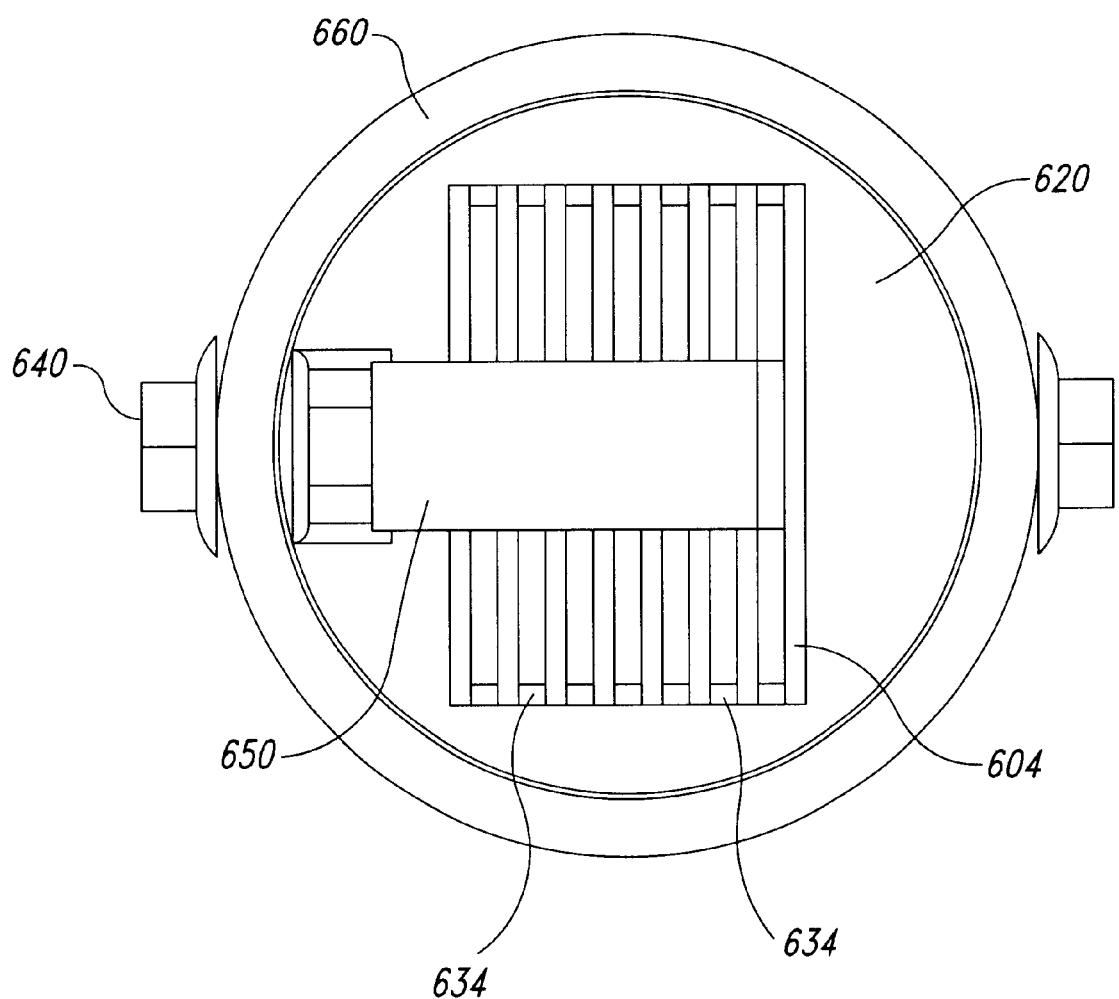
FIG. 12 is an end view of one embodiment of the housing and cell taken along the line 12—12 shown at FIG. 9 according to the principles of the present invention.

In one embodiment and as shown in FIGS. 10, 11, and 12, the electrode plate assembly 600 further includes a water block 620 at a top and a bottom end of the electrode plates 604. A grooved plate rail 630 sandwiches an upper and lower side of the plates 604 wherein an edge of one charging plate 604 extends into the grooves 634 of the plate rail 630. A titanium bolt 640 connects to L-shaped bracket 650 at each end of the plates 604. The bracket 650 in the illustrated embodiment is shown welded to the charging plates. Alternatively, the electrolytic cell may be bolted together as shown in FIG. 6. The bolts 640 provide an electric connection to the charging plate 604 to conduct power to the cell 334 for electrolysis to occur and extends through to the outside of the housing 812 (shown in FIG. 9) of the cell 334.

During operation, the electrolytic cell has direct current power supplied thereto so as to provide a flow of electric current through the liquid flowing therein. The passage of electric current causes some of the molecules to split into their component parts creating hydrogen gas and oxygen gas. If the liquid includes water, some of the water molecules will split apart. If other fluids or molecules are in the cell, some of them may also be split apart, depending on the energy level and chemical bonds. For example, if chlorine compounds or molecules are in the fluid, some of them will be split. Also, other compounds, including hydrocarbons of various types, may have one or more atoms split from the molecule or the entire molecule split apart when subjected to the energy of electricity passing from one plate to another. Since the type and number of fluids and molecules in the fluid may vary greatly from site to site, it is not needed to describe all the possible compounds and atoms that may be split or created by energizing the cell. It is sufficient to state that many molecules in the fluid will be affected and altered by the energy of passing on electric current between the plates with the fluid present. As shown in FIG. 3, at the outlet of the electrolytic cell, the hydrogen gas, represented by the large bubbles 26 and the oxygen gas, represented by the small bubbles 24, exit from the electrolytic cell. Both the hydrogen gas 26 and the oxygen gas 24 are, at this time, mainly in the gaseous state. Hydrogen bubbles 26 are generally larger and more likely to remain separated from the water itself. Oxygen bubbles, on the other hand, are quite numerous and create a cloud effect immediately at the exit of the electrolytic cell 334. Both the hydrogen and oxygen, at this stage being in gaseous form, begin to rise in the water. In addition, the water is usually moving through the tube as shown by direction arrow B in FIG. 3. In some embodiments, the water may be stationary and even in those embodiments, the gases will still rise slowly through the tube, the gas being lighter than the water.

As the oxygen 24 rises through the gas distribution tube 336 it will transition from a gaseous state to a dissolved state, greatly reducing the number of separate oxygen gas molecules therein. The length L is selected to be sufficiently long that a majority of the oxygen molecules become dissolved oxygen in the water, see FIG. 7. Many of the hydrogen molecules will react with substances in the contaminated groundwater to neutralize or inhibit the effects of the contaminants. On the other hand, some of the hydrogen molecules are more likely to retain in the gaseous state through the entire length of the tube and thus will remain in the gaseous form as shown by bubbles 26.

According to principles of the present invention, the decontamination apparatus 10 is composed in such a way that it can be easily assembled and disassembled, particularly in the field. For example, the various units including the pump, the housing, and the gas distribution chamber are connected with easily releasable fittings or fasteners such that a user can disassemble it. It also includes easy-to-assembly connectors such that a user can quickly assemble it in the field or perform a reassembly after the cleaning. For example, the coupling between the pump 330 and the housing for the electrolytic cell 334 is preferably an easy-release and easy-assemble-type coupling. An example of this type of coupling includes threaded union, snap-on clamp, rubber gasket seals or other couplings that can easily be assembled and disassembled. In the embodiment shown in FIGS. 4–7, the coupling is a threaded coupling using standard threaded fittings between the pump, the housing, and the gas distribution chamber. In the embodiment of FIGS. 8–2, the couplings and connections include various unions and gaskets which are rotatable with respect to each other such that both units can be held stationary while being connected to each other. Other acceptable, and equivalent, coupling techniques can be used so as to provide easy disassembly in the field for cleaning and maintenance, and also permitting easy assembly and reassembly so the unit may be put back into service by a general worker that does not require special skills or training in this particular technical field. Further, it can be reassembled and put back into service in a very short period of time following such disassembly for cleaning.

Figure 13B:
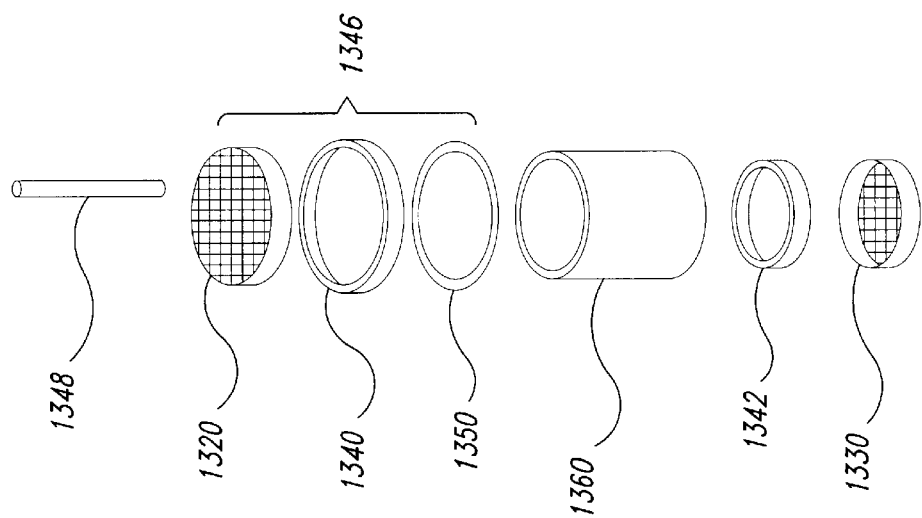
FIG. 13B is an exploded view of the support housing of FIG. 13A.
Figure 13A:
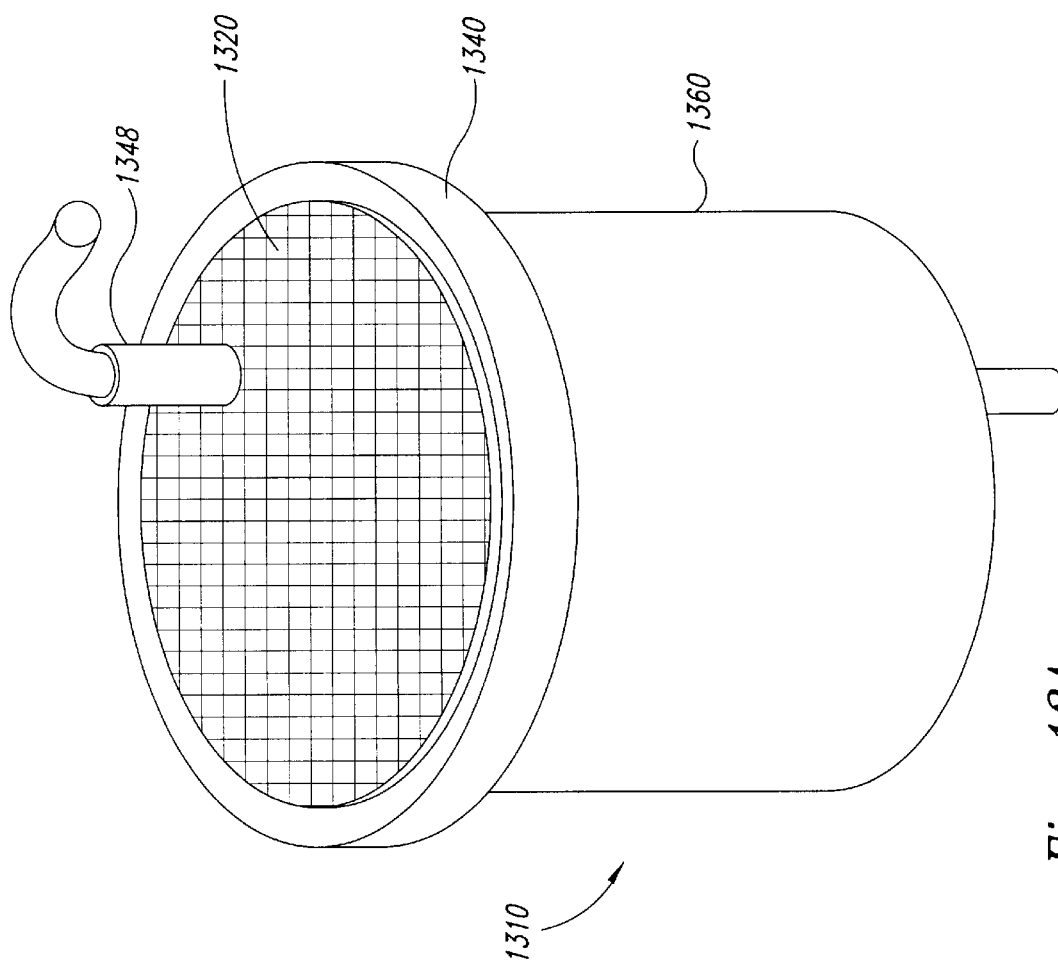
FIG. 13A is an isometric view of a support housing according to the principles of the present invention.

FIG. 13A illustrates a top support housing 1300 having a gas absorption cap 1310. FIG. 13B illustrates an exploded view of the housing 1300 and gas absorption cap 1310 of FIG. 13A. The support housing 1300 can provide support for the suspended decontamination system 10 positioned in the treatment well 310. The gas absorption cap 1310 includes a PVC mesh screen 1320 at an upper end and a PVC mesh screen 1330 at a lower end. The mesh screens 1320 and 1330 are held in place with PVC rings 1340, 1342 and a "O" ring 1350. A PVC shoulder 1340 supports the mesh screen assembly 1320 and coupler 1360 extending into the well 310. The coupler 1360 is filled with a gas and/or water absorbing compound, such as charcoal. The housing 1300 and gas absorption cap 1310 are designed to hold the weight of the decontamination system and to filter any free gasses that do not enter the aquifer. The coupler 1360 is refillable with an absorbent compound. In one exemplary embodiment, the cap may be 2 to 4 inches in height. The cap includes a penetration tube 1348 to allow the support cables and power cords for the decontamination system to extend therethrough.

Figure 14:
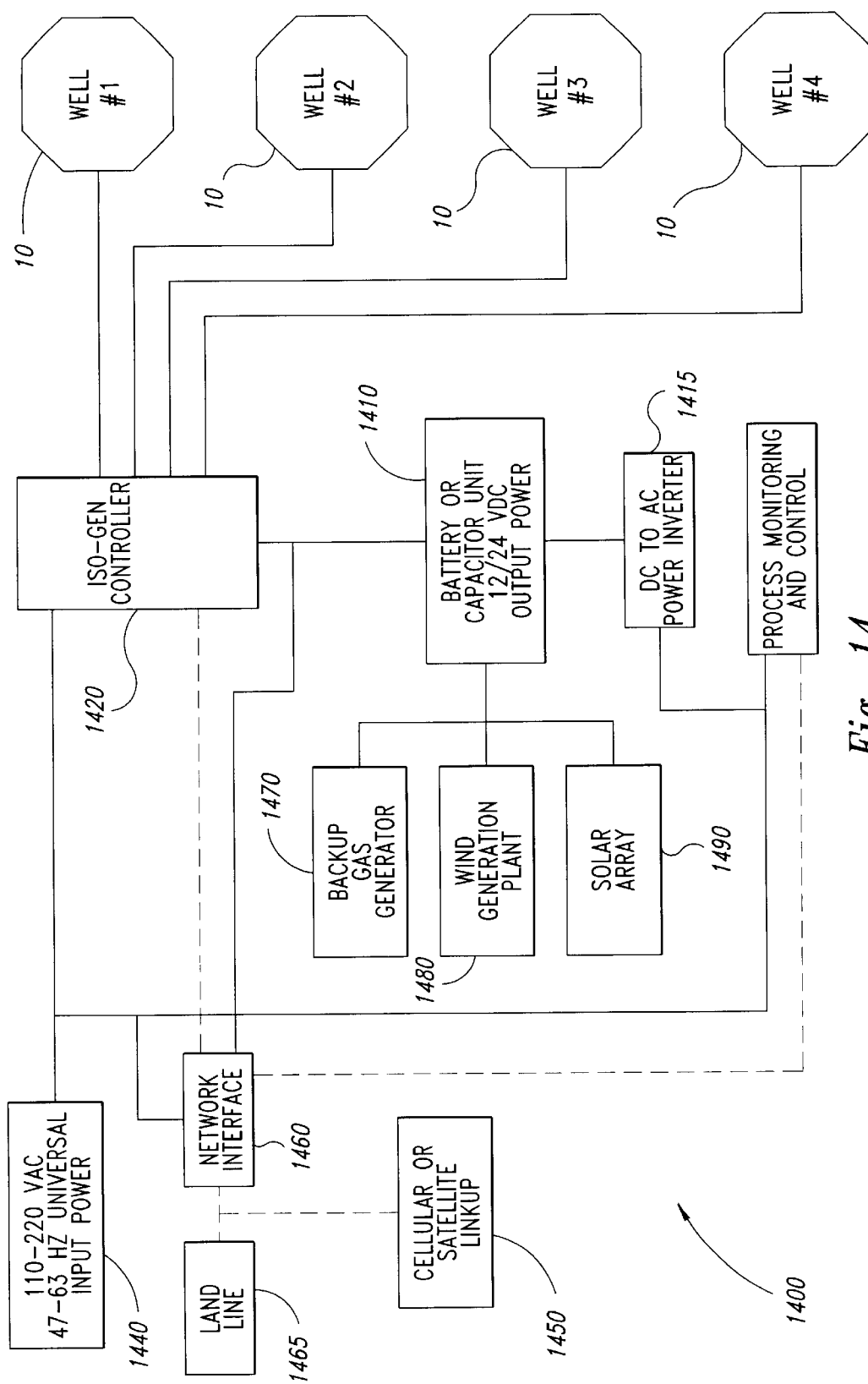
FIG. 14 is a schematic diagram of the decontamination system in accordance to the principles of the present invention.

FIG. 14 illustrates a schematic diagram of one embodiment in which power is supplied to a system 1400 via a battery or capacitor unit 1410 including a DC to AC power inverter unit 1415. Amperage should be user adjustable. The power supply unit 1420 can power up to 4 electrolytic cells and pumps 10, though only one cell (pump) 10 typically operates at any one given time. Drive to the cell and pump 10 is initiated by internal timing of a controller unit 1420. The power supply 1420 should include reverse polarity to the cell 10 for each treatment cycle. When a treatment cycle starts, it should operate in an opposite polarity from the previous treatment cycle to clear the cell plates. Varying hardness of water and different fluids may cause build-up on the plates, including calcium carbonate and magnesium carbonate. For this reason, periodic inspection and cleaning with vinegar or a 50/50 mix of muriatic acid and water may be necessary. The controller unit 1420 will direct power to be supplied to the cell for 10 minutes on every hour, this timing feature should be adjustable up to 30 minutes at 5 minute increments. Adjustment can be jumpers, dip switches or another means mounted to a board or otherwise connected to the controller unit 1420. The controller unit 1420 also operates a DC submersible pump (not shown). The pump runs 5 amps @ 12 volts. The cell and pump 10 operate simultaneously, however after the cell is powered down at the end of a treatment cycle the pump should continue to run for an additional period of time. Although this period may vary, in an preferred embodiment it is 3 minutes. Pump amperage is electronically monitored and if the pump fails then the controller unit 1420 illuminates a red LED (not shown) to indicate a bad pump. The system monitors the cell for at least 2 failure conditions. The first failure condition is an amp overcurrent, at which time the cell should be turned off. The second failure condition is an amp undercurrent, which indicates a worn out cell. Both of these conditions should illuminate the red LED. In some embodiments, the overcurrent condition will be in the range of 5 to 10 amps and the undercurrent condition be in the range of 0.5 to 1 amp, though both these ranges may vary depending on the site, the type of fluid and cell configuration.

The controller unit 1420 should try to restart the failed system 1400 for 12 operating cycles, after 12 operating cycles a permanent failure will be indicated. An input power supply 1440 should operate on either 110 or 220 VAC power at 47 to 63 hz and should carry UL-CSA (etc) approval for sale domestically and internationally.

Power to the cell and pump 10 should require no additional external cabling beyond the power cords 338 shown in FIG. 3. However, provisions should be made to connect the power cord to an external power supply. Normally, a standard 220 volt or 115 volt supply will be acceptable. Cell and pump 10 will utilize four-conductor power cord 338, the gage of which will vary with the length of the wire run. Enclosure must be Nema 4 (or 4X) and can either be metal or fiberglass and can be wall mounted. Fiberglass is preferred. All cabling in and out of the enclosure should be hardwired within conduits, and should be installed by the on-site electrician. A yellow "power ON" light is mounted on the front of an enclosure for the controller unit 1420, near the main power on switch—to indicate main power on. Three red/green LEDS should be mounted to the enclosure front indicating which of the three systems is operating. The green will indicate system is on, a steady red LED will indicate if a pump has failed. A flashing red LED will indicate overcurrent to cell or cell failure depending on the pattern of flash. Cables penetrate the controller enclosure through the bottom. It is preferred to build these electronics into a Class 1 Div. 1 explosion proof enclosure.

If the cell tries to draw more excessive current or registers a dead short then the cell is powered down, and the pump alone will circulate for the remainder of the treatment cycle. An external indicator for a cell fault will be activated continuously. When a cell fault occurs at a well, the controller unit 1420 or operator will automatically begin operation at the next cell in the bank. The controller unit 1420 will test the fault cell again each time the fault cell's turn comes up in the operation order. If the fault cell begins to operate normally then it is allowed to rejoin the normal operation order. Further, if the controller unit 1420 is applying the maximum available voltage to the cell sufficient current is not attained then the controller unit 1420 should indicate Cell Undercurrent while allowing operation at the cell. The controller unit 1420 should power down the cell if it drops below some minimum threshold and the maximum voltage is being applied to the cell. Additionally, if the pump draws too much or too little current, then it is a fault and the pump should be shut down and activate an external indicator. The cell voltage will normally ramp up from 0 to its normal operating voltage and current to maintain operation. Soft start circuitry can work well. When starting a pump the pump should be activated for 5 seconds then shut down for 5 seconds then reactivated and operated at that time.

Additional features to the system can include a modem access 1450 via a network interface 1460. Either wireless access or a landline 1465 may be employed. An optional modem board design will be required to access and download data from the controller. Remote trouble shooting of cells and pumps, remote turn on/shut off (lockout) and reset features are also available when a network interface via modem, cable or satellite is used. Process monitoring and control system may be added and are required to be synchronized with the operation of the controller unit 1420. Monitoring of DO, ORP, pH, bacterial counts can be conducted with existing "off the shelf" systems which can be purchased and interfaced to the controller unit 1420. Measurements taken by these devices should be synchronized with the controller unit 1420 so the readings are properly taken in relation to the treatment cycles. Process control equipment such as pH adjustment and the automatic addition of biological/nutrient slurries can also be purchased and interfaced into the controller unit 1420. An optional explosion proof enclosure to house the electronics may be used.

Additional features to the system may include a back-up gas generator 1470, a wind generation plant 1480 or a solar array 1490.

In operation, as power is supplied to the pump, the pump creates a circulation of the fluid in the well. Alternatively, groundwater flow may create circulation of the fluid. As power is supplied to the electrolytic cell, the passage of electric current causes some of the water molecules to split into their component parts creating hydrogen gas and oxygen gas. As the gases travel upward through the gas distribution tube, the oxygen gas dissolves into dissolved oxygen. Actual dissolved oxygen will depend on the absorption of the oxygen gas produced. Absorption will vary with temperature and water column height. The oxygen gas can serve to clean or remove contaminants from the groundwater in reactions known in the art and previously published in many literature sources. In addition, the free hydrogen gas can also act to inhibit the problems of pollution from hydrocarbons. A number of chain reactions and molecule division and creation are possible depending on the contaminants found in the groundwater, the specific treatment process employed, enzymes, chemicals, or vitamins added to facilitate and accelerate the process, etc., In one possible reaction, the hydrogen gas or hydrogen radical can abstract a hydrogen atom to form water, as with alkanes or alcohols:

•Hydrogen Abstraction

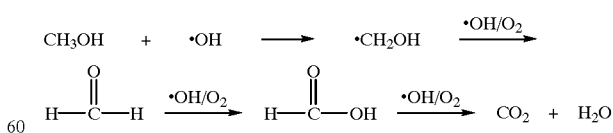

In another possible reaction, the hydroxyl radical can add to a contaminant, as is the case for olefins or aromatic compounds in the following reaction:

•Addition

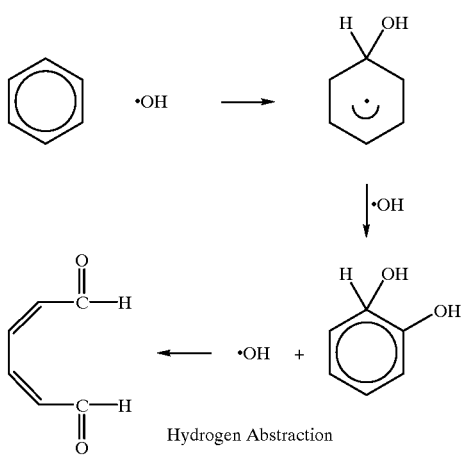

Hydrogen Abstraction

This application of electrocatalytic chemistry using both oxygen and hydrogen results in the overall rate of oxidation of a contaminant being greatly increased over that obtained by the simple addition of oxidizing agents (i.e., oxygen, ozone, permanganate or peroxide, etc.). In large part, this is due to the much greater involvement of highly reactive initiators (radicals) such as the hydroxyl radical (OH) created by the metallic alloys on the electrolytic cell. The hydroxyl radical reactor typically million to a billion times faster than ozone and hydrogen peroxide, resulting in a greatly reduced treatment cost and system size.

As shown by the above exemplary chemical reactions, the attack by the hydroxyl radical, in the presence of oxygen, initiates a complex cascade of oxidative reactions leading to mineralization. As a rule of thumb, the rate of destruction of a contaminant is approximately proportional to the rate constant for the contaminant with the hydroxyl radical. Alkenes are treated most efficiently because the double bond is very susceptible to hydroxyl attack; saturated molecules (i.e., alkanes) have much smaller rate constants and therefore, are more difficult to oxidize.

Testing for total petroleum hydrocarbon (TPH), chemical oxygen demand (COD) and BTEX reveals reductions in the total organic load. This can be attributed to the effects of hydroxyl radicals produced by the electrocatalytic cell system.

The general reduction in the total petroleum hydrocarbon is due to the electrocatalytic cell production of the hydroxyl radicals (OH). Hydroxyl radicals within highly contaminated wells mineralize a broad range of organic compounds. The groundwater leaving this impacted well will then contain less organic compounds and also will have reduced the chemical oxygen demand in the aquifer.

Dissolved oxygen plays an integral part in the aerobic biological remediation of a total petroleum hydrocarbon impacted site. The dissolved oxygen produced by the electrocatalytic cell of the present invention each day was calculated to be 2,984 mg. Use of the decontamination apparatus has resulted in the increase in the heterotrophic plate counts for aerobic bacteria in the surrounding monitoring wells. As the total petroleum hydrocarbon decreases, in time so would the bacterial populations with a diminished carbon source. Thus, field study provides information as to the beneficial effects of applying dissolved oxygen into the contaminated groundwater aquifer by either chemical or physical means.

In another additional feature, the pump cell and gas distribution tube as shown in the exemplary embodiment are hooked together with flexible tubing to allow the decontamination system to bend if needed. This flexibility allows the system to be installed in environments that require a non-linear installation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

EXAMPLE APPLICATION

The object of this experiment was to field test the decontamination system. The following is a description of the equipment used:

A. Cell

Two cells were constructed for this installation. Both cells used the standard loading EC-400 plate coating. These cells could be reversed. The cells were disposable and were not rebuildable. Estimated life of the ISO-GEN cells was 90 days.

B. Pump

The pump used for this installation was a DC purge pump manufactured and sold by Enviro-Tech Services Co. This pump circulates water inside the well at approximately 3 gpm. It had a stainless impeller, nitrile seals and an ABS casing. This pump was classified as a "purge pump" and was not designed for long continuous duty operation. The manufacturer recommends that the pump will last for approximately 300 to 450 hours and then it will need replacing. This pump should be monitored closely for failure during its operation.

C. Electronic Controller

The controller includes a DC pump interface to control the new pump, a change in the software to make the controller run as a constant current device until it runs out of available voltage (mainly due to plating of the cell) at which time it will revert to constant voltage and run at its maximum voltage output. A modem will also be used to allow for remote dial up of the controller for data collection purposes.

D. Gas Distribution Chamber

The distribution chamber was constructed from ½-inch PVC and the hole size was 3/16 inch (instead of ⅛ inch) to accommodate for buildup of any materials through the holes.

The following results were recorded from the field test of the decontamination system:

|  | 6/10/99 | 7/14/99 | 8/12/99 | 9/10/99 | % Change | 10/12/99 |
|---|---|---|---|---|---|---|
| Benzene | 0.183 | 0.033 | 0.011 | 0.006 | 97% | 0.003 |
| Toluene | 0.188 | 0.005 | 0.002 | 0.002 | 99% | 0.001 |
| EthylBnz | 0.221 | 0.103 | 0.063 | 0.020 | 91% | 0.030 |
| Total Xylene | 0.177 | 0.241 | 0.192 | 0.078 | 56% | 0.041 |
| Dissolved Oxygen | 0.9 | 17.4 | 14.7 | 16.7 |  | 15.4 |
| LEL | 0% | 0% | 0% | 0% |  | 0% |

All results except LEL (lower explosion limit) are in mg/l (ppm).

What is claimed is:

1. An apparatus for in-situ decontamination of a contaminated groundwater, comprising:

a well having a bottom elevation below a water level of the contaminated ground water;

a pump having an intake for drawing the contaminated groundwater into the pump, the pump positioned below the water level of the contaminated groundwater;

an electrolytic cell enclosed in a housing, the housing having an inlet and an outlet, the inlet of the housing coupled to the pump to receive groundwater from the pump; and a gas distribution chamber coupled to the outlet of the housing of the electrolytic cell, the gas distribution chamber including at least one opening at an end distal to the electrolytic cell.

2. The apparatus of claim 1 wherein the gas distribution chamber is vertically oriented and longitudinally extends a selected vertical distance above the outlet of the housing.

3. A system for decontaminating contaminated groundwater in-situ, comprising:

a well having a bottom elevation below a water level of the contaminated groundwater;

a pump having an intake, the intake positioned in the well below the water level of the contaminated groundwater;

an electrolytic cell enclosed in a housing, the housing positioned above and coupled to the pump, wherein the pump draws contaminated groundwater into the intake and circulates the contaminated groundwater through the electrolytic cell; and a gas distribution chamber positioned above the electrolytic cell, the gas distribution chamber coupled to the housing, the distribution chamber having an outlet for exiting circulated groundwater.

4. The system of claim 3 wherein the electrolytic cell includes electrolytic plates comprising anodes and cathodes coated in a plated material, wherein the plating material on the electrolytic plates is selected from the group consisting of noble and transition metals.

5. The system of claim 3 wherein the electrolytic cell includes electrolytic plates comprising anodes and cathodes, wherein the anodes are coated with tin and the cathodes are coated with platinum.

6. The system of claim 3, further comprising replaceable absorbant filtration materials positioned in a head space of the well, wherein the filtration materials reduce an escape of off gases.

7. The system of claim 3, further comprising support cables attached to the gas distribution chamber for lowering the system into place.

8. The system of claim 3, further comprising a power supply wherein the power supply is a reversible polarity constant current DC power system.

9. A method of facilitating accelerated in-situ bioremediation of a body of water, comprising:

positioning an in-situ oxygen generating device having an electrolytic cell in the body of water;

pumping in-situ fluid from the body of water into the electrolytic cell of the oxygen generating device;

passing an electric current through the electrolytic cell to create a process liquid in which hydrogen gas and oxygen gas are generated;

moving the process liquid through a gas distribution chamber over a sufficient distance to allow the oxygen gas to dissolve into dissolved oxygen; and returning the process liquid to the body of water;

wherein the body of water is an underground aquifer and the method further comprises drilling a borehole to form a well into the aquifer wherein a bottom of the borehole extends below a water table.

10. A method of facilitating accelerated in-situ bioremediation of a body of water, comprising:

positioning an in-situ oxygen generating device having an electrolytic cell in the body of water;

pumping in-situ fluid from the body of water into the electrolytic cell of the oxygen generating device;

passing an electric current through the electrolytic cell to create a process liquid in which hydrogen gas and oxygen gas are generated;

moving the process liquid through a gas distribution chamber over a sufficient distance to allow the oxygen gas to dissolve into dissolved oxygen;

returning the process liquid to the body of water; and inserting a casing into a well wherein a selected lower portion of the casing is perforated to allow liquid to flow through the casing.

* * * * *